United States Patent [19]

Tsugane et al.

[11] Patent Number: 4,961,211

[45] Date of Patent: Oct. 2, 1990

[54] TELEVISION CONFERENCE SYSTEM INCLUDING MANY TELEVISION MONITORS AND METHOD FOR CONTROLLING THE SAME

[75] Inventors: Shuzo Tsugane; Tooru Yasuda, both of Tokyo, Japan

[73] Assignee: NEC Corporation, Japan

[21] Appl. No.: 213,327

[22] Filed: Jun. 30, 1988

[30] Foreign Application Priority Data

Jun. 30, 1987 [JP] Japan .................. 62-161341

[51] Int. Cl.$^5$ ....................... H04M 11/00; H04N 7/14
[52] U.S. Cl. ..................................... 379/54; 379/202; 379/206; 455/5; 358/85
[58] Field of Search .................. 379/53, 54, 202, 206; 358/85; 455/5

[56] References Cited

U.S. PATENT DOCUMENTS

| | | | |
|---|---|---|---|
| 4,004,084 | 1/1977 | Brown et al. | 379/54 |
| 4,054,908 | 10/1977 | Poirier et al. | 379/54 |
| 4,400,724 | 8/1983 | Fields | 358/85 |
| 4,449,238 | 5/1984 | Lee et al. | 379/54 |
| 4,456,789 | 6/1984 | Groves et al. | 379/202 |
| 4,489,442 | 12/1984 | Anderson et al. | 381/103 |
| 4,658,425 | 4/1987 | Julstrom | 379/206 |
| 4,673,974 | 6/1987 | Ito et al. | 358/86 |

FOREIGN PATENT DOCUMENTS

| | | | |
|---|---|---|---|
| 0055815 | 5/1977 | Japan | 358/85 |
| 52-55815 | 5/1977 | Japan | 358/85 |
| 53-83417 | 7/1978 | Japan | 358/85 |
| 0149861 | 11/1981 | Japan | 379/206 |

OTHER PUBLICATIONS

"Technical Description of NETEC-Z TV CODEC", NEC America, Inc., Pub'n. DEX-5548, issue 3, Sep. 1986.

R. Trueman, "A Communication System for Remote Conferencing", *Systems Technology*, Jun. 1976, No. 24.

E. F. Brown et al., "A Continuous Presence Video Conferencing System", National Telecommunications Conference, Dec. 3-6, 1978, pp. 34.1.1-34.1.4.

H. Kaneko et al., "NETEC-6/3 Video Transmission Equipment for Teleconference", INTELCON 79 Exposition Proceedings, Feb. 26-Mar. 2, 1979, pp. 579-582.

*Primary Examiner*—Jin F. Ng
*Assistant Examiner*—Wing F. Chan
*Attorney, Agent, or Firm*—Ostrolenk, Faber, Gerb & Soffen

[57] ABSTRACT

A television conference system includes, in a transmitting side, a plurality of TV cameras assigned with camera ID codes, and in a receiving side, a plurality of TV monitors assigned with monitor ID codes and frame memories for storing inputs to the TV monitors. In the transmitting side, a moving picture signal output from a TV camera selected by a camera ID number is encoded, and the encoded moving picture signal together with a monitor ID code of a TV monitor designated to display an output from the selected TV camera are transmitted to the receiving side. In the receiving side, writing is performed in a frame memory corresponding to the TV monitor designated by the monitor ID signal to display a moving picture on the TV monitor, writing in each of the frame memories corresponding to the other TV monitors is inhibited and the last frame of the latest moving picture displayed thereon is displayed as a still picture, and selection of the TV camera and designation of the TV monitor are arbitrarily performed.

12 Claims, 7 Drawing Sheets

TELEVISION CONFERENCE SYSTEM INCLUDING MANY TELEVISION MONITORS AND METHOD FOR CONTROLLING THE SAME

BACKGROUND OF THE INVENTION

The present invention relates to a television conference system including many television monitors.

In the television conference system, a TV camera and a TV monitor are provided in each of two conference rooms, and an output from the TV camera in one of the conference rooms is transmitted to and displayed on the TV monitor in the other conference room as if a conference is being held in a single conference room.

Examples of the conventional television conference system of this type are a split screen system and a frame-multiplexing system. In a transmitting side of the split screen system, moving pictures output from, e.g., two cameras are encoded by an encoder and transmitted to a receiving side. In the receiving side, the moving pictures are separated and reproduced, and the reproduced pictures are displayed on two TV monitors.

In the above conventional systems, as described in "TECHNICAL DESCRIPTION OF NETEC-Z TV CODEC" of NEC ENGINEERING REVIEW (Sept., 1986), since a large number of participants are imaged by two TV cameras, a size of a picture of each participant is reduced. As a result, it is difficult to give the participants ambience so that they feel they are united together. However, if three or more cameras are used, each reproduced picture is displayed on an area of ⅓ or less of the entire screen in the split screen system. Therefore, only a portion above the neck of each participant can be reproduced. In the frame multiplexing system, each picture can be transmitted at a rate of only 10 frames/sec or less. As a result, time resolution is degraded, and reproducibility of the picture becomes poor.

SUMMARY OF THE INVENTION

It is, therefore, an object of the present invention to provide a television conference system including many television monitors, which can eliminate the above conventional drawbacks.

In a method according to the present invention for controlling a television conference system including many television monitors, the television conference system comprises, in a transmitting side, a plurality of microphones each for converting a voice of a participant into a voice signal, a plurality of TV cameras each for converting an image of a participant or a document into a moving picture signal, and encoder means for encoding/multiplexing at least the voice signal and the moving picture signal and transmitting the multiplexed signal and in a receiving side, decoder means for separating the multiplexed signal into at least the voice signal and the moving picture signal and decoding the signals; the decoder means including a frame memory for storing the moving picture signal, a plurality of TV monitors for displaying the decoded moving picture signal, and loudspeaker means for converting the decoded voice signal into a sound. The method comprises the steps of assigning camera ID numbers to the plurality of TV cameras, assigning monitor ID numbers to the plurality of TV monitors; in the transmitting side, selecting and encoding one of moving pictures output from the plurality of TV cameras to be encoded by the encoder means using the camera ID number, encoding a voice signal output from one of the plurality of microphones, encoding the monitor ID number of a TV monitor which is to display the selected moving picture, and multiplexing and transmitting the encoded moving picture signal, voice signal, and monitor ID number; and in the receiving side, separating the multiplexed moving picture signal, voice signal, and monitor ID number, storing the moving picture signal in the frame memory and causing the TV monitor selected in accordance with the monitor ID number to output the moving picture signal in units of frames to display a moving picture, and causing each of TV monitors not designated by the monitor ID number to display the last frame of the latest moving picture displayed thereon as a still picture, the last frame being output from the frame memory means.

A television conference system according to the present invention comprises, in a transmitting side, a plurality of microphones each for converting a voice of a speaking participant into a voice signal, a plurality of TV cameras each for converting an image of a participant or a document into a moving picture signal, controller means for receiving the voice signals from the plurality of microphones, and outputting a voice signal representing a voice of a speaker, a camera ID signal designating one of the plurality of TV cameras, and a monitor ID signal designating one of a plurality of TV monitors installed in a receiving side, switching means for selecting an output from the TV camera designated by the camera ID signal from the controller means, first A/D converting means for A/D-converting a moving picture signal output from the switching means, second A/D converting means for A/D-converting the voice signal output from the controller means, and means for multiplexing outputs from the first and second A/D converting means and the monitor ID signal output from the controller means and outputting the multiplexed signal to a transmission path; and in a receiving side, signal separator means for separating the moving picture signal, the voice signal, and the monitor ID signal from the multiplexed signal received through the transmission path, means for D/A-converting the voice signal output from the signal separator means and reproducing the voice of the speaker, means for outputting a control signal designating one of the plurality of TV monitors to which the moving picture signal output from the signal separator means is to be supplied on the basis of the monitor ID signal output from the signal separator means, a plurality of frame memory means, provided in one-to-one correspondence to the plurality of TV monitors, for receiving the moving picture signal output from the signal separator means and the control signal, writing in one of the plurality of frame memory means corresponding to the TV monitor designated by the control signal being allowed, and writing in the other frame memory means being inhibited, and a plurality of D/A converter means for D/A-converting outputs from the plurality of frame memory means and outputting the converted signals to the plurality of TV monitors, thereby displaying a moving picture from the TV camera which is currently selected on one of the plurality of TV monitors designated by the control signal, and displaying, on each of the other TV monitors, the last frame of the latest moving picture displayed thereon as a still picture.

Other features and advantages of the present invention will become apparent from the following descrip-

DETAILED DESCRIPTION OF THE PREFERRED EMBODIMENTS

Figure 1:
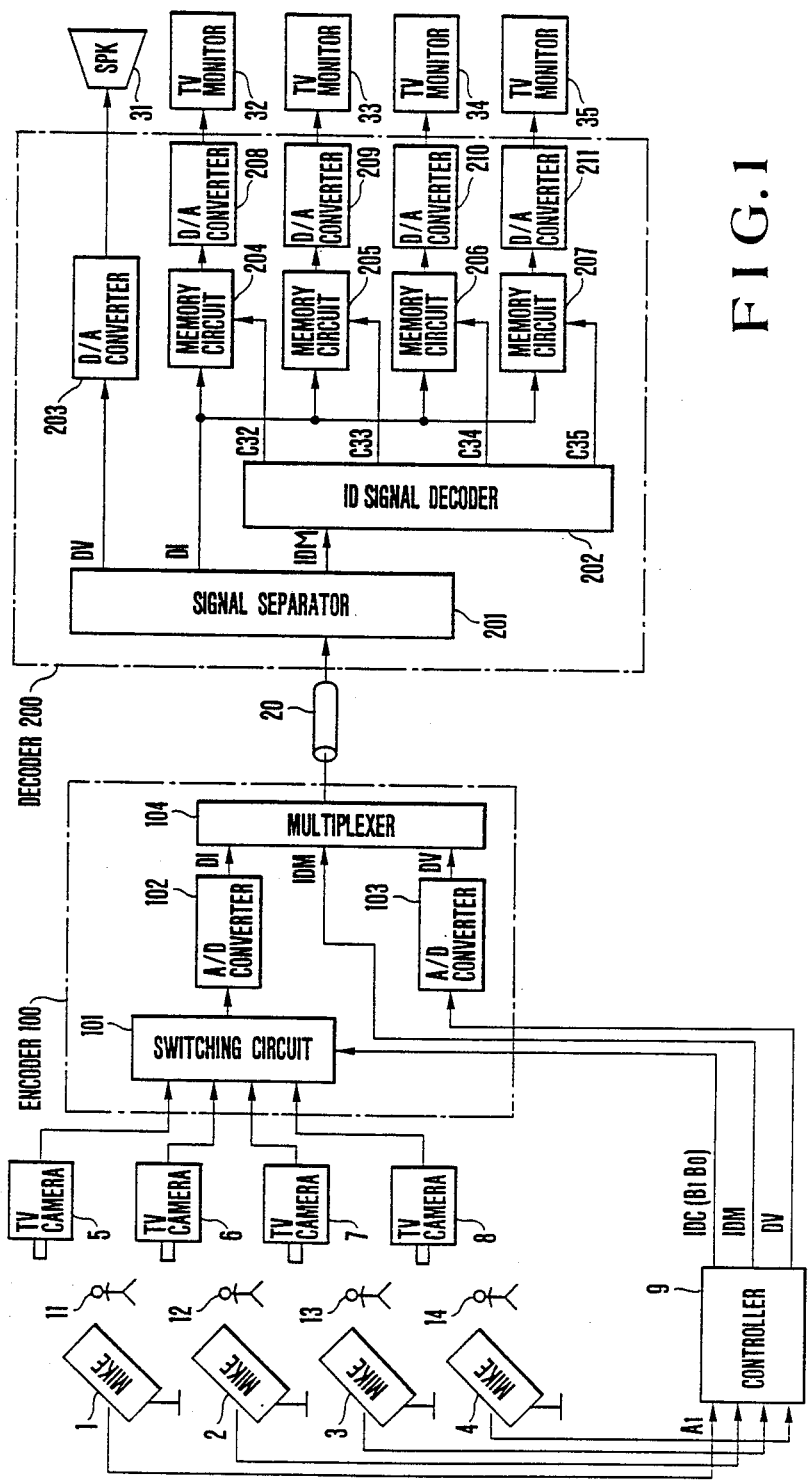
FIG. 1 is a block diagram showing an arrangement of an embodiment of the present invention.

In FIG. 1, the left half represents a transmitting side, and the right half represents a receiving side. The transmitting and receiving sides are connected by a transmission path 20.

In the transmitting side, microphones 1, 2, 3, and 4 for participants 11, 12, 13, and 14 are connected to a controller 9. The controller 9 detects a speaking person among the participants 11 to 14 on the basis of an output signal $A_1$ from the corresponding microphone.

TV cameras 5, 6, 7, and 8 visually monitor the participants 11, 12, 13, and 14, respectively, and supply output picture signals to a switching circuit 101. Each of the TV cameras 5 to 8 has its own ID code of a 2-bit binary code ($B_1,B_0$). When the controller 9 detects a speaker, it supplies an ID signal IDC representing an ID code of a TV camera which photographs the speaker to the switching circuit 101. The switching circuit 101 selects an output from one of the TV cameras 5 to 8 which visually monitors the speaker and outputs a picture signal DI in accordance with the ID signal IDC from the controller 9.

The picture signal output from the switching circuit 101 is supplied to one of input terminals of a multiplexer 104 through an A/D converter 102.

In order to select one of TV monitors 32, 33, 34, and 35 (to be described later) in the receiving side so that the selected monitor displays the observed picture, the controller 9 outputs a monitor ID signal IDM consisting of a 2-bit binary code as the second input of the multiplexer 104.

The controller 9 outputs a voice signal DV which is one of the output signals $A_1$ from the microphones 1 to 4 and represents the speaker as the third input of the multiplexer 104 through an A/D converter 103.

The multiplexer 104 multiplexes the monitor ID signal IDM of the TV monitor, the picture signal which is A/D-converted by the A/D converter 102, and the voice signal which is digitized by the A/D converter 103, and outputs the multiplexed signal to the transmission path 20 in accordance with a predetermined transmission path format. The picture switching circuit 101, the A/D converters 102 and 103, and the multiplexer 104 constitute an encoder 100.

In the receiving side, the signal received through the transmission path 20 is supplied to a signal separator 201 and separated into the monitor ID signal IDM, the picture signal ID, and the voice signal DV. The TV monitor ID signal IDM, the picture signal DI, and the voice signal DV are respectively supplied to an ID signal decoder 202, memory circuits 204, 205, 206, and 207, and a D/A converter 203.

The ID signal decoder 202 decodes the TV monitor ID signal and supplies control signals $C_{32}$, $C_{33}$, $C_{34}$, and $C_{35}$ to the memory circuits 204 to 207, respectively, in accordance with a decoding result.

Each of the memory circuits 204 to 207 stores the picture signal DI supplied from the signal separator 201 in units of frames. Writing of the picture signal DI in the memory circuits 204 to 207 is allowed or inhibited by the control signals $C_{32}$ to $C_{35}$, respectively. Outputs from the memory circuits 204, 205, 206, and 207 are converted into analog signals by D/A converters 208, 209, 210, and 211 and supplied to and displayed on TV monitors 32, 33, 34, and 35, respectively.

The voice signal DV from the signal separator 201 is supplied to a loudspeaker 31 through the D/A converter 203. The signal separator 201, the D/A converter 203, the memory circuits 204 to 207, and the D/A converters 208 to 211 constitute a decoder 200.

An operation of the embodiment shown in FIG. 1 will be described below.

During a conference, each time a speaker is switched in the transmitting side, an input picture to be encoded by the encoder 100 is switched to a moving picture output from the TV camera photographing the speaker. The moving picture DI, the monitor ID signal IDM, and the voice signal DV of the speaker are multiplexed and transmitted. In the receiving side, the moving picture is displayed on one of the TV monitors 32 to 35 corresponding to the monitor ID signal IDM.

Each TV monitor corresponding to one of the TV cameras 5 to 8 whose output is not encoded by the encoder 100 displays a picture signal stored in a corresponding one of the memory circuits 204 to 207, i.e., the last one frame of the latest moving picture signal displayed thereon as a still picture.

Figure 2:
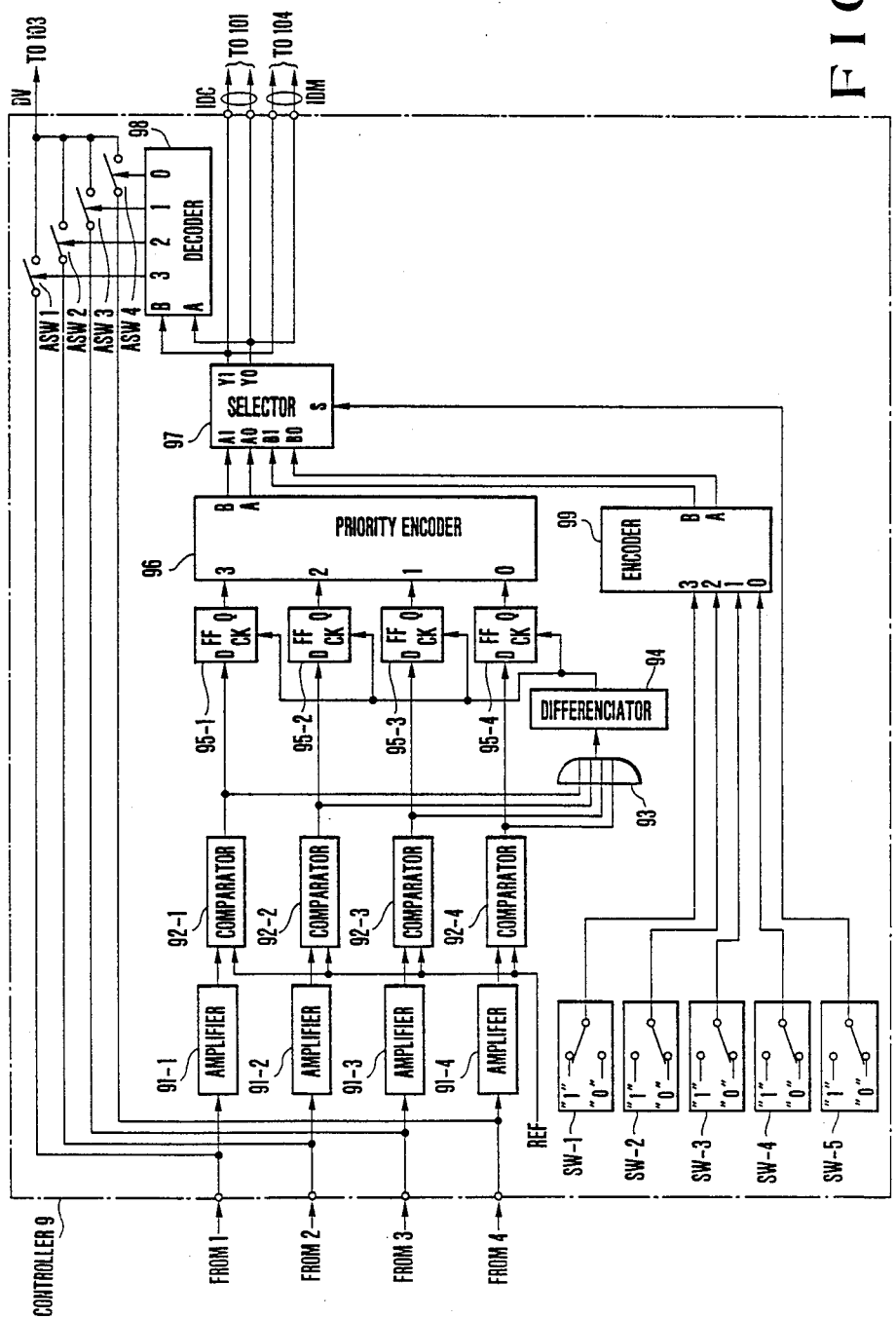
FIG. 2 is a circuit diagram of an embodiment of a controller in FIG. 1.

FIG. 2 is a circuit diagram showing an embodiment of the controller 9 in FIG. 1.

In FIG. 2, outputs from the microphones 1, 2, 3, and 4 are supplied to amplifiers 91-1, 91-2, 91-3, and 91-4 and switches ASW1, ASW2, ASW3, and ASW4, respectively. An output from each of the amplifiers 91-1 to 91-4 is supplied to a respective input terminal of a corresponding one of comparators 92-1 to 92-4. A preset reference voltage REF is applied to the other input terminal of each of the comparators 92-1 to 92-4. Each of the comparators 92-1 to 92-4 outputs a signal of high level ("1") when the one input exceeds the reference voltage REF, thereby representing that a voice is input to a corresponding one of the microphones 1 to 4. When the input is smaller than the reference voltage REF, each of the comparators 92-1 to 92-4 outputs a signal of low level ("0"), thereby representing that no voice is input to a corresponding one of the microphones 1 to 4.

The outputs from the comparators 92-1 to 92-4 are supplied to an OR gate 93 and corresponding flip-flops 95-1 to 95-4, respectively. An output from the OR gate 93 is supplied to a differentiator 94. The differentiator 94 detects a leading edge of the input signal and generates and supplies a switching clock to the flip-flops 95-1 to 95-4.

Outputs from the flip-flops 95-1 to 95-4 are supplied to a priority encoder 96. The priority encoder 96 encodes the input 4-bit signal into a 2-bit signal. The priority encoder 96 has a priority order with respect to the inputs. Stated another way, the inputs are hierarchially arranged and the 2-bit signal is formed to identify the hierarchically highest input, the flip-flop 94-1 to 95-4 of which has assumed a high level ("1"). Therefore, when a plurality of inputs go to "1" at the same time, the priority encoder 96 encodes in accordance with the priority order. Outputs from the priority encoder 96 are supplied to input terminals $A_1$ and $A_0$ of a selector 97.

Reference symbols SW-1, SW-2, SW-3, and SW-4 denote manual switches for selecting the TV cameras 5, 6, 7, and 8, respectively. When one of the manual switches SW-1 to SW-4 goes to "1", a corresponding one of the TV cameras 5 to 8 is selected. Outputs from the switches SW-1 to SW-4 are encoded into 2-bit signals by an encoder 99 and supplied to input terminals $B_1$ and $B_0$ of the selector 97.

Reference symbol SW-5 denotes a manual switch for switching selection of the TV camera from automatic to manual and vice versa. When automatic selection is to be selected, the switch SW-5 supplies "1" to a control terminal S of the selector 97, and when manual selection is to be selected, it supplies "0 to the control terminal S of the selector 97. The selector 97 selects input signals to the input terminals $A_1$ and $A_0$ or $B_1$ and $B_0$ in accordance with whether the input to the control terminal S is "0" or "1" and outputs these signals from output terminals $Y_1$ and $Y_0$. Outputs from the output terminals $Y_1$ and $Y_0$ of the selector 97 are decoded by a decoder 98 to close one of the switches ASW1 to ASW4, and also supplied to the switching circuit 101 and the multiplexer 104 as the camera ID signal IDC and the monitor ID signal IDM, respectively.

An output from a microphone corresponding to the closed one of the switches ASW1 to ASW4 is output therethrough to the A/D converter 103 as the voice signal DV.

Figure 3:
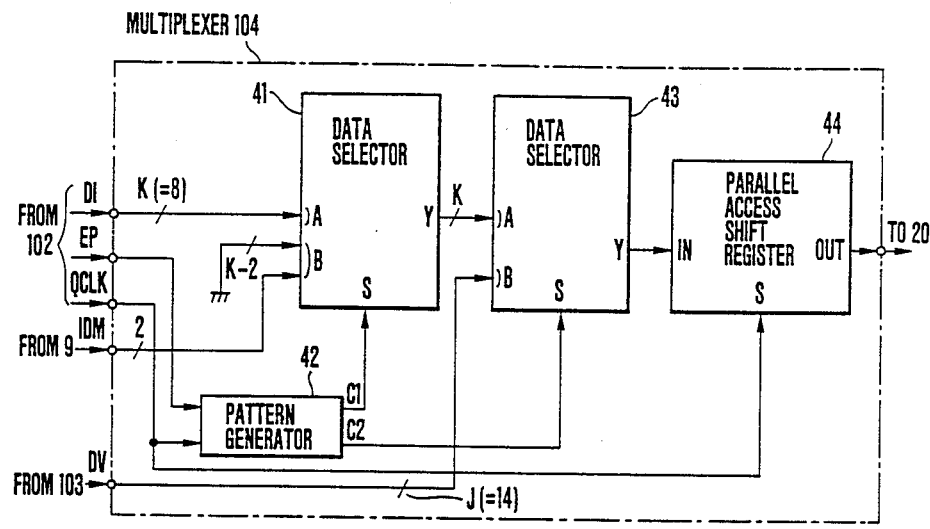
FIG. 3 is a circuit diagram of an embodiment of a multiplexer in FIG. 1.

FIG. 3 is a circuit diagram showing an embodiment of the multiplexer 104.

In FIG. 3, a pattern generator 42 generates control signals $C_1$ and $C_2$ on the basis of a frame pulse FP generated in units of frames of the frame picture and a sampling clock (Q clock) QCLK supplied from the A/D converter 102. A data selector 41 receives a K(8)-bit picture signal DI from the A/D converter 102 at its A terminal and receives the monitor ID signal IDM and a (K-2) (6)-bit signal of "0" at its B terminal. The data selector 41 multiplexes the input signals to the A and B terminals into a K-bit parallel signal and outputs the multiplexed signal from an output terminal Y in accordance with the control signal $C_1$ received at a terminal S from the pattern generator.

A data selector 43 multiplexes the K-bit parallel signal supplied from the data selector 41 to its terminal A and a J(14)-bit voice signal DV supplied from the A/D converter 103 to its terminal B and outputs the multiplexed signal from its terminal Y in accordance with the control signal $C_2$ supplied from the pattern generator 42.

A parallel access shift register 44 is controlled by the Q clock QCLK and converts the parallel signal output from the data selector 43 into a serial signal.

Figure 4:
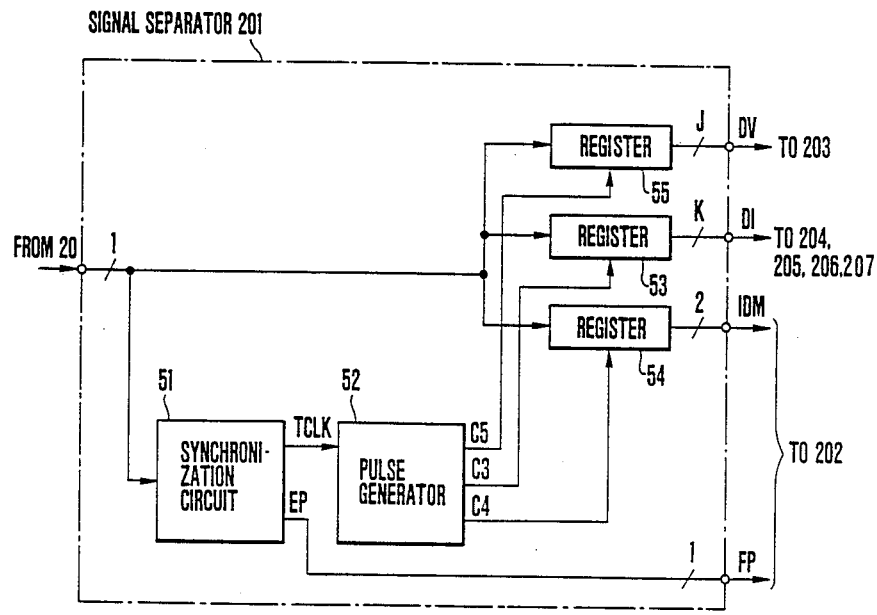
FIG. 4 is a circuit diagram of an embodiment of a signal separator in FIG. 1.

FIG. 4 is a circuit diagram showing an arrangement of an embodiment of the signal separator 201 in FIG. 1.

In FIG. 4, serial reception data from the transmission path 20 is supplied to a synchronization circuit 51 and registers 53, 54, and 55. The synchronization circuit 51 extracts a transmission path clock TCLK and the frame pulse FP from the input reception data and outputs them to a pulse generator 52 and the ID signal decoder 202. The pulse generator 52 supplies control signals $C_3$, $C_4$, and $C_5$ to the registers 53, 54, and 55, respectively, using the transmission path clock TCLk output from the synchronization circuit 51.

The register 55 develops the serial voice signal into a J-bit parallel signal and outputs the developed signal to the D/A converter 203 in accordance with the control signal $C_5$ supplied from the pulse generator 52. The register 53 develops the serial picture signal into a K-bit parallel signal and outputs the developed signal to the memory circuits 204 to 207 in accordance with the control signal $C_3$. The register 54 develops the TV monitor ID signal into a 2-bit parallel signal and outputs the developed signal to the ID code decoder 202 in accordance with the control signal $C_4$.

Figure 5:
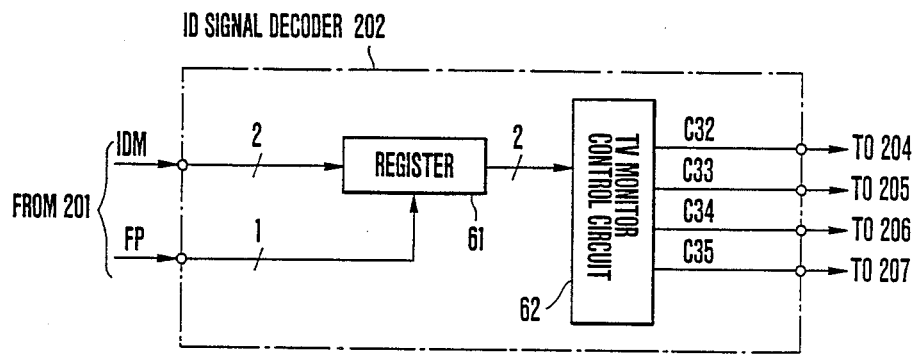
FIG. 5 is a circuit diagram of an embodiment of an ID signal decoder in FIG. 1.

FIG. 5 is a circuit diagram showing an arrangement of an embodiment of the ID signal decoder 202 in the decoder 200.

In FIG. 5, the 2-bit monitor ID signal IDM is loaded in a register 61 in accordance with the frame pulse FP. A TV monitor control circuit 62 outputs control signals $C_{32}$ to $C_{35}$ for controlling writing of picture data in the memory circuits 204 to 207 on the basis of an output signal from the register 61.

Figure 6:
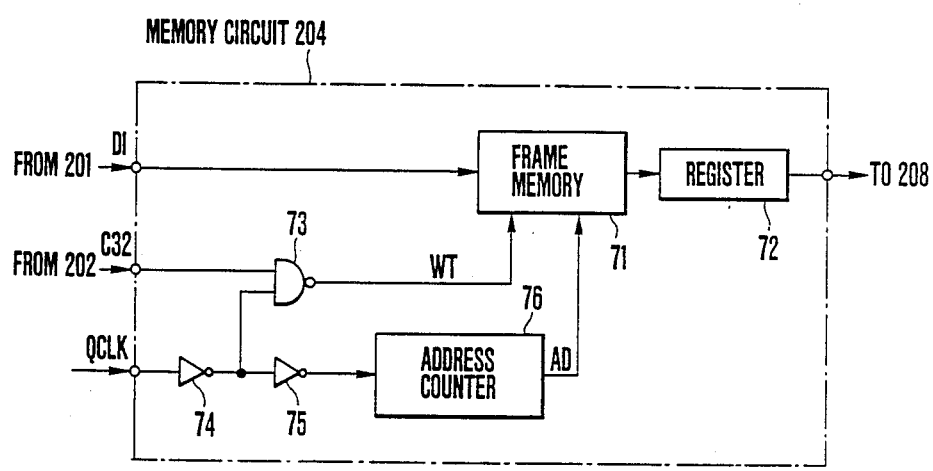
FIG. 6 is a circuit diagram of a memory circuit in FIG. 1.

FIG. 6 is a circuit diagram showing an arrangement of an embodiment of the memory circuit 204. The memory circuits 205, 206, and 207 have the same arrangement as that of the memory circuit 204.

In FIG. 6, a frame memory 71 stores the picture signal DI from the signal separator 201. The control signal $C_{32}$ output from the ID signal decoder 202 is supplied to one input terminal of a NAND gate 73. The sampling clock QCLK is inverted by an inverter 74. An output from the inverter 74 is supplied to the other input terminal of the NAND gate 73. The NAND gate 73 supplies a memory write pulse WT to the frame memory 71. An output from the inverter 74 is inverted by an inverter 75 supplied to an address counter 76. The address counter 76 outputs a read/write address signal AD for the frame memory 71. An output from the frame memory 71 is latched by a register 72. An output from the register 72 is supplied to the D/A converter 208.

An operation of the system shown in the block diagram of FIG. 1 which incorporates the embodiments shown in FIGS. 2 to 6 will be described below.

The following Table shows a relationship between the TV camera ID signals and displayed pictures of the respective TV monitors.

TABLE

| Speaker (Microphone No.) | Camera ID Signal (= Monitor ID Signal) | | Picture on TV Monitor | | | |
|---|---|---|---|---|---|---|
| | $B_1$ | $B_0$ | TV Monitor 32 | TV Monitor 33 | TV Monitor 34 | TV Monitor 35 |
| 1 | 0 | 0 | MV of Camera 5 | ST | ST | ST |
| 2 | 0 | 1 | ST | MV of Camera 6 | ST | ST |
| 3 | 1 | 0 | ST | ST | MV of Camera 7 | ST |
| 4 | 1 | 1 | ST | ST | ST | MV of Camera 8 |

In the above Table, reference symbol MV represents a moving picture; and ST, a still picture.

The speakers (microphone Nos.) 1 to 4, the TV cameras 5 to 8, and the TV monitors 32 to 35 always correspond to one another in one-to-one correspondence. The camera ID signal IDC and the monitor ID signal IDM coincide with each other and represented by two bits of $B_1$ and $B_0$ in the above Table.

FIGS. 7(a) to 7(k) are timing charts showing changes in the signals in the operation. In FIGS. 7(a) to 7(k), reference symbol F represents one frame period.

The switch SW-5 of the controller 9 is set to an automatic side, i.e., to be "0".

Figure 7:
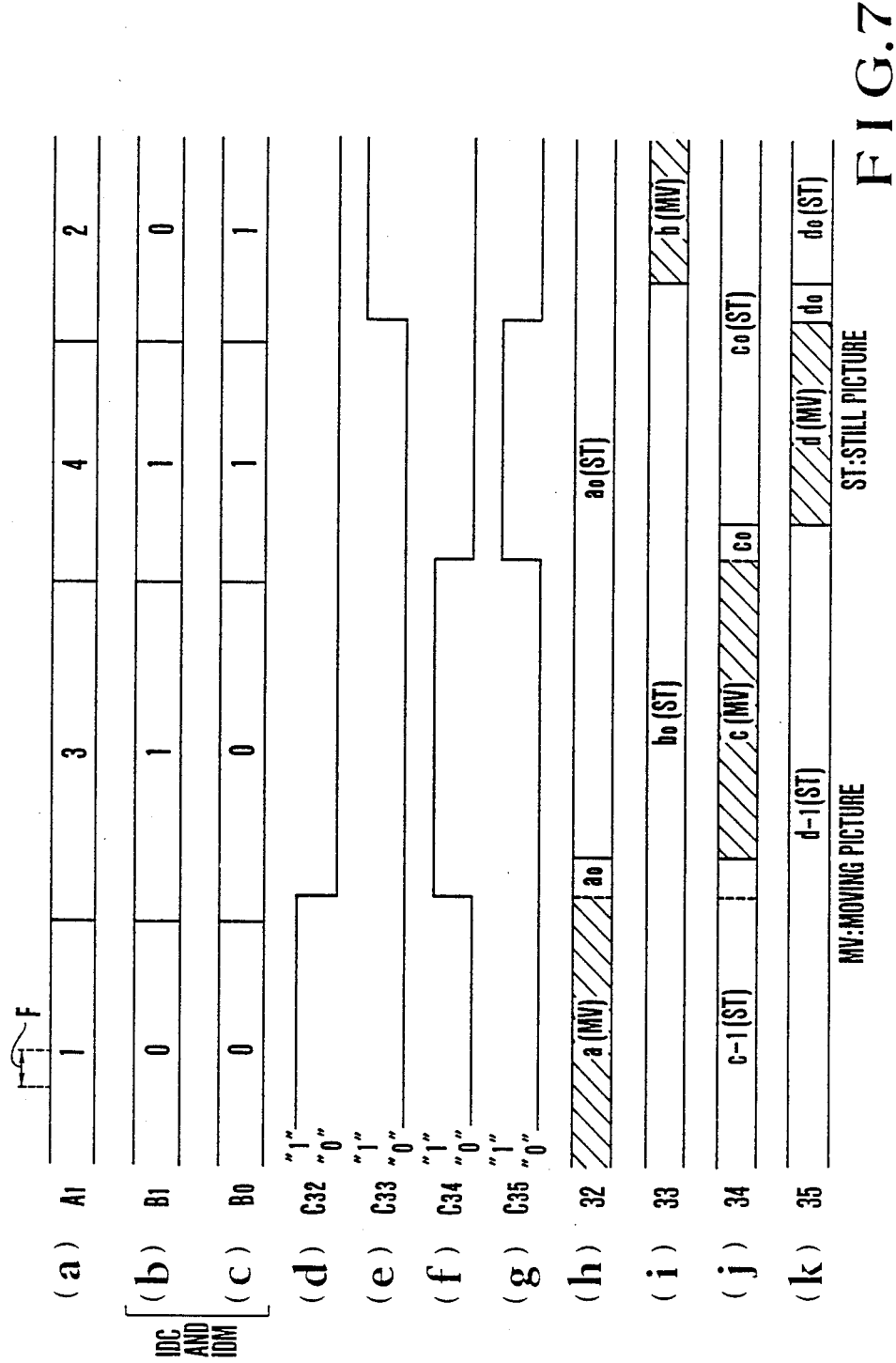
FIGS. 7(a) to 7(k) are views for explaining an operation of the embodiment in FIG. 1.

When a participant 1 speaks, a voice output from the microphone 1 is supplied to the controller 9. The controller 9 discriminates the microphone 1 corresponding to the speaker in accordance with input signals $A_1$ from the microphones 1 to 4. The controller 9 supplies the output signal from the microphone 1 to the A/D converter 103 and supplies the camera ID signal IDC of "00" to the switching circuit 101, as shown in FIGS. 7(b) and 7(c). The switching circuit 101 switches its output to a picture signal of the TV camera 5 on the basis of the camera ID signal IDC (0,0). The monitor ID signal IDM supplied from the controller 9 to the multiplexer 104 becomes "00".

The multiplexer 104 multiplexes the monitor ID signal IDM, the K-bit picture data output from the A/D converter 102, and the J-bit voice data output from the A/D converter 103, converts the parallel multiplexed signal into a serial signal, and outputs the converted signal to the transmission path 20. At this time, the monitor ID signal IDM ($B_1,B_0$) need only be multiplexed once at a start position of the frame in synchronism with the frame pulse FP.

If the participants 13, 14, and 12 speak in this order, the outputs DV from the controller 9 are changed into voice outputs from the microphones 3, 4, and 2, the output picture signals from the switching circuit 101 are changed into the outputs from the TV cameras 7, 8, and 6, and the monitor ID signal IDM is changed into "10", "11", and "01", respectively. Thus, processing for each speaker is similarly performed in the transmitting side.

In the receiving side, the ID signal decoder 202 changes the control signals $C_{32}$, $C_{33}$, $C_{34}$, and $C_{35}$ shown in FIGS. 7(d), 7(e), 7(f), and 7(g) in accordance with a change in the monitor ID signal IDM ($B_1,B_0$). These control signals inhibit writing in the memory circuits 204 to 207 while they are set to be "0". Therefore, when the control signals $C_{32}$ to $C_{35}$ are "1"s as shown in FIGS. 7(d), 7(e), 7(f), and 7(g), the TV monitors 32, 33, 34, and 35 display moving pictures as shown in FIGS. 7(h), 7(i), 7(j), and 7(k), respectively. Meanwhile, when the control signals $C_{32}$ to $C_{35}$ are "0"s, the TV monitors 32, 33, 34, and 35 display pictures $a_0$, $b_0$, $c_0$, and $d_0$ of the last frames of the moving pictures as still pictures.

Figure 8:
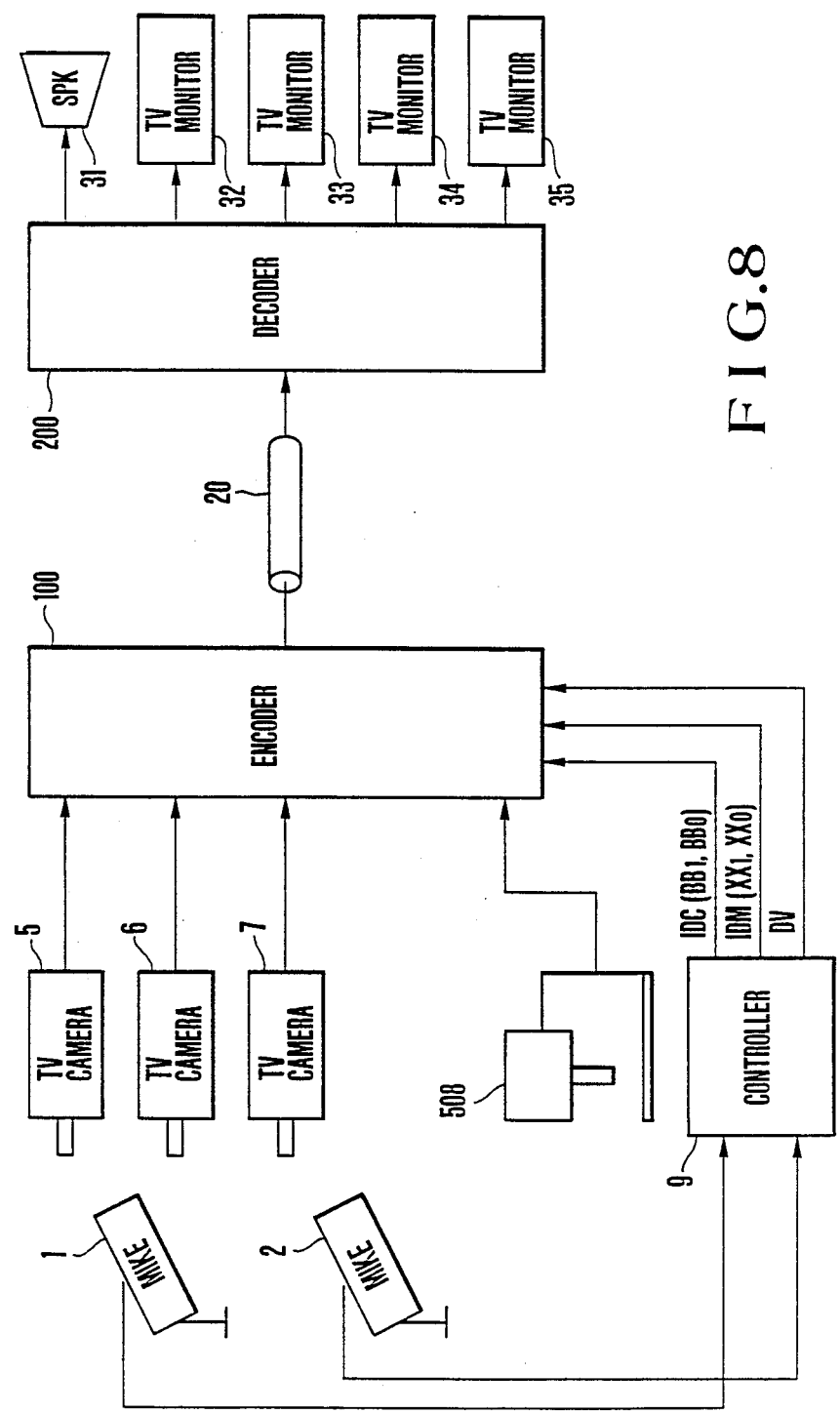
FIG. 8 is a block diagram showing an arrangement of another embodiment of the present invention.

FIG. 8 is a block diagram of an another embodiment of the present invention. In FIG. 8, the same reference numerals as in FIG. 1 denote the same parts. In this embodiment, a still picture camera 8 is installed in a transmitting side, and a TV monitor 35 is installed for only a still picture.

In FIG. 8, by setting a switch SW-5 to "1", a controller 9 controls not in accordance with voices input from microphones 1 and 2, but a chairman of a conference freely switches a 2-bit TV camera ID signal IDC ($BB_1$, $BB_0$) for selecting a picture to be encoded and transmitted and a 2-bit TV monitor ID signal IDM ($XX_1$, $XX_0$) representing a TV monitor which outputs a picture.

An operation of the system shown in FIG. 8 will be described below with reference to timing charts of FIGS. 9(a) to 9(l) representing timings of signals. In FIGS. 9(a) to 9(l), reference symbol F represents one frame period.

Figure 9:
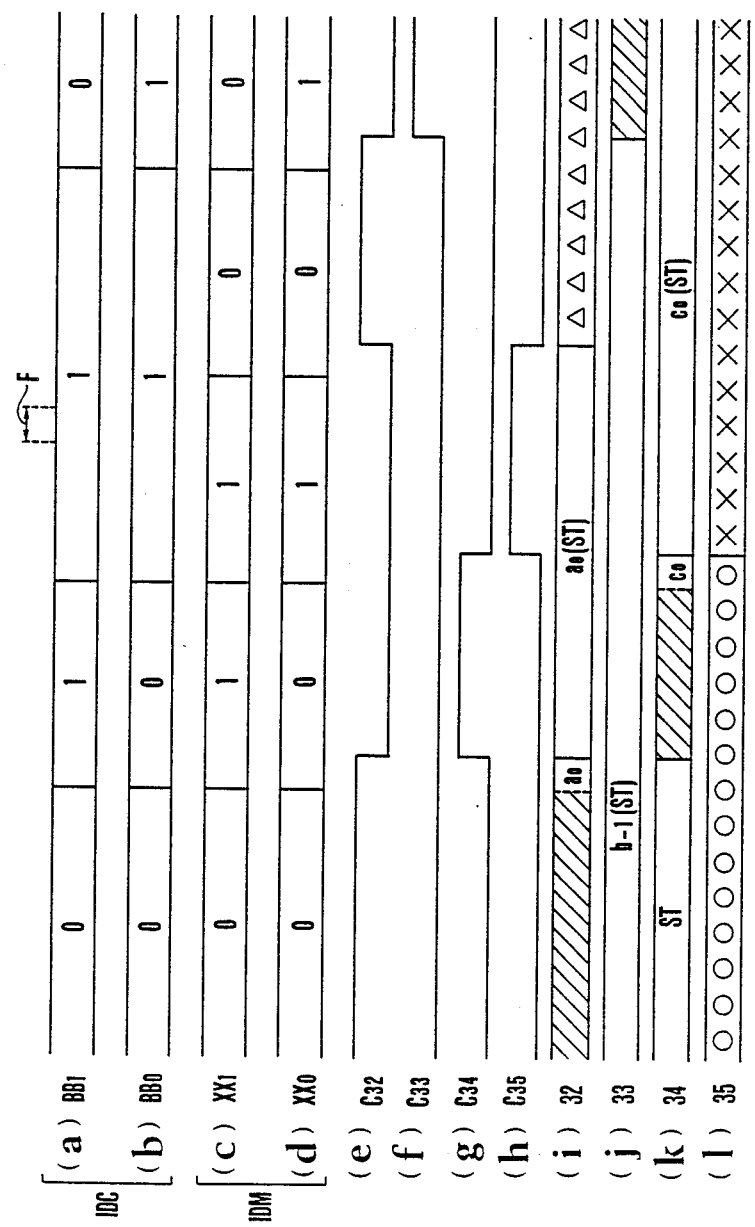
FIGS. 9(a) to 9(l) are views for explaining an operation of the embodiment in FIG. 8.

Assume that the controller 9 outputs the TV camera ID signal IDC ($BB_1,BB_0$) of (0,0), (1,0), (1,1), and (0,1) as shown in FIGS. 9(a) and 9(b), thereby switching an output from a switching circuit 101 sequentially from moving picture TV cameras 5 and 7, the document TV camera (still picture camera) 8, and a moving picture TV camera 6. In addition, assume that the controller 9 outputs the TV monitor ID signal IDM ($XX_1,XX_0$) of (0,0), (1,0), (1,1), (0,0), and (0,1) as shown in FIGS. 9(c) and 9(d). That is, while an output from the TV camera 8 is selected, the TV monitor 35 is switched to a TV monitor 32.

An encoder 100 multiplexes the picture signal, the TV monitor ID signal IDM ($XX_1,XX_0$), and the voice signal DV and supplies the multiplexed signal to a transmission path 20 as described in the first embodiment of FIG. 1.

In a decoder 200, as described in the first embodiment of FIG. 1, control signals $C_{32}$ to $C_{35}$ shown in FIGS. 9(e), 9(f), 9(g), and 9(h) are supplied to memory circuits 32 to 35, respectively, on the basis of the decoded monitor ID signal ($XX_1,XX_0$) As in the operation of the system in FIG. 1, in the memory circuits 32 to 35, when the control signals $C_{32}$ to $C_{35}$ are "0"s, writing in a frame memory 71 is inhibited. When the control signals are "1"s, the decoded picture signal is written in the frame memory 71. As a result, when the control signals $C_{32}$ to $C_{35}$ are "1"s as shown in FIGS. 9(i) to 9(l), moving pictures are output from the TV monitors 32 to 34. When the control signals $C_{32}$ to $C_{35}$ are "0"s, still pictures are output from the TV monitor 35. Symbols Δ, o, and x represent output pictures of different documents of the document camera (still picture TV camera) 8.

As has been described above, according to the present invention, many TV monitors are installed in a receiving side, and parts to be noticed are reproduced on different monitors. As a result, ambience is increased as if a remote conference room is present in the receiving side. For example, as a speaker moves, a moving picture is moved so that all the participants can always been seen. Therefore, the participants will not feel anxiety. In addition, a plurality of graphs can be displayed on the many TV monitors at the same time, thereby effectively transmitting a complicated content to the receiving side.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system for providing television conferencing from a transmit side to a receive side, the transmit side including a plurality of associated microphone-TV camera pairs, the microphones being for producing speaker-voice signals and the TV cameras being for producing speaker-moving picture signals, the receive side including a loudspeaker for broadcasting a selected one of the speaker-voice signals and a plurality of TV monitors for respectively displaying selected ones of either the speaker-moving picture signals or a still frame of such signals, each of the TV cameras and the TV monitors having a respective ID, the transmit and receive sides being interconnected by a transmission link, the system further comprising:

selection means for both predetermining according to ID a respective TV monitor for displaying a speaker-moving picture signal and a TV camera whose speaker-moving picture signal is to be transferred to the respective TV monitor via the transmission link;

the selection means comprising automatic selection means including (i) a plurality of detection means for detecting in the microphones a greater-than-threshold speaker-voice level in any microphone, wherein the TV camera associated with any such microphone is selected in the absence of another microphone having a greater-than-threshold voice level; and (ii) priority means operative when more than one of said microphones has a greater-than-threshold voice level for selecting one of said more than one microphones in accordance with a predetermined priority order associated with said microphones.

2. The television conferencing system of claim 1, wherein the selector means further comprises override means for overriding the automatic selection means, the override means comprising a manual selection means for manually selecting a microphone whose associated TV camera is thereby selected.

3. The television conferencing system of claim 2, wherein the override means comprises a manual mode-selection switch.

4. The television conferencing system of claim 1, further comprising last-frame-display means for displaying on each of the non-predetermined TV monitors the last frame of the speaker-moving picture shown on the just-previously predetermined TV monitor.

5. The television conferencing system of claim 4, wherein the last-frame-display means comprises digital storage means.

6. The television conferencing system of claim 1, wherein the TV monitor-predetermining means comprises means to arrange the predetermined status according to a one-to-one correspondence between the TV cameras and the TV monitors.

7. The television conferencing system of claim 1, wherein the TV monitor-predetermining means comprises means to arrange the predetermined status according to an arbitrary correspondence between the TV cameras and the TV monitors.

8. A system for providing television conferencing from a transmit side to a receive side, the transmit side including a plurality of associated microphone-TV camera pairs, the microphones being for producing speaker-voice signals and the TV cameras being for producing speaker-moving picture signals, the receive side including a loudspeaker for broadcasting a selected one of the speaker-voice signals and a plurality of TV monitors for respectively displaying selected ones of either the speaker-moving picture signals or a still frame of such signals, each of the TV cameras and the TV monitors having a respective ID, the transmit and receive sides being interconnected by a transmission link, the system further comprising:

selection means for both predetermining according to ID a respective TV monitor for displaying a speaker-moving picture signal and a TV camera whose speaker-moving picture signal is to be transferred to the respective TV monitor via the transmission link;

the selection means including an automatic selection means and override means for overriding the automatic selection means, the override means comprising a manual selection means for manually selecting a microphone whose associated TV camera is thereby selected, the manual selection means including a manual mode-selection switch the manual selection means being effective for selecting a speaker regardless of a priority order.

9. The television conferencing system of claim 8, further comprising last-frame-display means for displaying on each of the non-predetermined TV monitors the last frame of the speaker-moving picture shown on the just-previously predetermined TV monitor.

10. The television conferencing system of claim 9, wherein the last-frame-display means comprises digital storage means.

11. The television conferencing system of claim 8, wherein the TV monitor-predetermining means comprises meant o arrange the predetermined status according to a one-to-one correspondence between the TV cameras and the TV monitors.

12. The television conferencing system of claim 8, wherein the TV monitor-predetermining means comprises means to arrange the predetermined status according to an arbitrary correspondence between the TV cameras and the TV monitors.

* * * * *